(12) United States Patent
Kakehi

(10) Patent No.: US 8,454,024 B2
(45) Date of Patent: Jun. 4, 2013

(54) SEAL RING

(75) Inventor: Kouzou Kakehi, Toin (JP)

(73) Assignee: NTN Corporation, Osaka (JP)

( * ) Notice: Subject to any disclaimer, the term of this patent is extended or adjusted under 35 U.S.C. 154(b) by 579 days.

(21) Appl. No.: 12/224,897

(22) PCT Filed: Mar. 8, 2007

(86) PCT No.: PCT/JP2007/054539
§ 371 (c)(1),
(2), (4) Date: Oct. 8, 2008

(87) PCT Pub. No.: WO2007/105589
PCT Pub. Date: Sep. 20, 2007

(65) Prior Publication Data
US 2009/0051124 A1    Feb. 26, 2009

(30) Foreign Application Priority Data
Mar. 10, 2006 (JP) .................... 2006-066372

(51) Int. Cl.
*F16J 9/14* (2006.01)
*F16J 15/00* (2006.01)

(52) U.S. Cl.
USPC ............. 277/496; 277/546; 277/547

(58) Field of Classification Search
USPC ................. 277/496–498, 546–547
See application file for complete search history.

(56) References Cited

U.S. PATENT DOCUMENTS

| 5,660,398 A | | 8/1997 | Terao et al. |
| 5,882,012 A | * | 3/1999 | Niwa et al. .................. 277/407 |
| 5,934,680 A | * | 8/1999 | Kakehi et al. ................ 277/499 |

(Continued)

FOREIGN PATENT DOCUMENTS

| JP | 8-135797 | 5/1996 |
| JP | 10-061777 | 3/1998 |

(Continued)

OTHER PUBLICATIONS

International Search Report issued Apr. 17, 2008 in the International (PCT) Application of which the present application is the U.S. National Stage.

(Continued)

*Primary Examiner* — Vishal Patel
(74) *Attorney, Agent, or Firm* — Wenderoth, Lind & Ponack, L.L.P.

(57) ABSTRACT

In a seal ring, first and second abutments that are opposed to each other at a cut-apart portion have first and second protrusions 3a and 3b and first and second recesses 4a and 4b that are juxtaposed to each other in the axial direction, and a radial gap 5a is defined between the first protrusion 3a of the first abutment 1a that is pressed against a side wall 13a of an annular groove 13 formed in a shaft member 12 near a non-oil pressure side 14b and the second recess 4b of the second abutment 1b, with the radial gap 5a and a circumferential gap 2 between the first and second abutments 1a and 1b forming a passage through which an oil pressure side 14a of the annular gap 14 communicates with the non-oil pressure side 14b. The abutments 1a and 1b are not complicated in shape, and still, foreign matter contained in oil in the oil pressure side 14a can be smoothly discharged into the non-oil pressure side 14b.

11 Claims, 3 Drawing Sheets

U.S. PATENT DOCUMENTS 6,349,943 B1 * 2/2002 Ishii et al. ................ 277/448
2005/0116426 A1 6/2005 Watanabe et al.
2006/0038355 A1 2/2006 Nakaoka et al.

FOREIGN PATENT DOCUMENTS

| JP | 11294595 A * | 10/1999 |
|---|---|---|
| JP | 2001-165322 | 6/2001 |
| JP | 2002-081551 | 3/2002 |
| JP | 2005-127382 | 5/2005 |
| WO | 03/078873 | 9/2003 |
| WO | 2004/011827 | 2/2004 |

OTHER PUBLICATIONS

Japanese Office Action, issued Apr. 3, 2012 (with English translation) in a Japanese application that is a foreign counterpart to the present application.

English translation of JP 11-294595, Oct. 29, 1999.

* cited by examiner

SEAL RING

TECHNICAL FIELD

This invention relates to a seal ring for sealing an annular gap between a housing and a shaft member rotatably mounted in the housing.

BACKGROUND ART

A seal ring used e.g. in hydraulic units of an automatic transmission or a continuously variable transmission for sealing an annular gap between a housing and a shaft member rotatably mounted in the housing is fitted in an annular groove formed in the radially outer surface of the shaft member, and pressed against a side wall of the annular groove near a non-oil pressure side and a radially inner surface of the housing that opposes the annular groove, thereby partitioning the annular gap into an oil pressure side and the non-oil pressure side.

Many of such seal rings are made of a resin, and cut apart at one circumferential point thereof to define circumferentially opposed abutments. A circumferential gap is defined between the abutments to allow for thermal expansion of the seal ring. Each of the abutments comprises a protrusion and a recess that are complementary in shape to and in engagement with the recess and the protrusion of the other abutment, respectively. In order to reduce friction and frictional heat buildup between the side wall of the annular groove near the non-oil pressure side and the side of the seal ring which is in sliding contact with the side wall of the annular groove, an oil passage is formed between the opposed abutments which communicates with both sides of the annular gap of the seal ring to allow oil in the oil pressure side of the annular gap to leak slowly into the non-oil pressure side of the annular gap, thereby supplying oil between the side wall of the annular groove and the side of the seal ring that is in sliding contact with the side wall of the annular groove, and simultaneously discharging wear dust contained in oil in the oil pressure side into the non-oil pressure side (see e.g. Patent documents 1 and 2).

The seal ring disclosed in Patent document 1 has a crank-shaped oil passage defined between abutments at its radially outer portion. The oil passage comprises a first axial oil groove extending to one side of the seal ring, a second axial oil groove extending to the other side of the seal ring, and a third circumferential oil groove connecting the first and second oil grooves together.

The seal ring disclosed in Patent document 2 is formed with a groove along the ridge where two adjacent ones of the outer wall surfaces of the protrusions of the abutments intersect each other. The groove has a polygonal or fan-shaped section in the direction of the ridgeline. An oil passage between the abutments is partially defined by gaps between the protrusions each formed with the above-described groove and the corners of recesses in engagement with these protrusions. Specifically, each of the grooves forming the gaps between the protrusions and the corners of the recesses are provided along a radial ridgeline where the front end surface of the protrusion intersects the outer side surface, an axial ridgeline where the front end surface intersects the radially inner surface, and a circumferential ridgeline where the radially inner surface intersects the inner side surface.

Patent document 1: JP Patent Publication 8-135797
Patent document 2: JP Patent Republication WO2003/078873

In the seal ring disclosed in Patent document 1, because the crank-shaped oil passage is partially formed by the circumferentially extending third oil groove defined between the inner side surface of one of the protrusions and the other abutment, the protrusions, which are made of a resin, tend to be deflected toward the inner side surface under the oil pressure of the oil pressure side, thereby narrowing the width of the third oil groove, or closing it. If this happens, foreign matter contained in oil on the oil pressure side may clog the third oil groove, thereby making it difficult to smoothly discharge foreign matter into an annular space on the non-oil pressure side.

In the case of the seal ring disclosed in Patent document 2, because grooves are formed along many ridgelines of the protrusions of the abutments, the abutments are complicated in shape. Also, because the oil passage formed by gaps defined between these grooves and the corners of the recesses have many bent portions, foreign matter contained in oil in the oil pressure side tends to clog the oil passage at these bent portions.

SUMMARY OF THE INVENTION

An object of the present invention is to provide a seal ring of which the abutments which oppose each other at the cut-apart portion are not complicated in shape, and still, foreign matter contained in oil in the oil pressure side can be smoothly discharged into an annular gap on the non-pressure side.

In order to achieve this object, the present invention provides a seal ring for partitioning an annular gap between a housing and a shaft member rotatably mounted in the housing into an oil pressure side and a non-oil pressure side, the seal ring being made of a resin, fitted in an annular groove formed in a radially outer surface of the shaft member and pressed against a side wall of the annular groove near the non-oil pressure side, and a radially inner surface of the housing that radially opposes the annular groove, wherein the seal ring is cut apart at one circumferential portion to define circumferentially opposed abutments, wherein a circumferential gap is defined between the abutments, wherein each of the abutments comprises a protrusion and a recess which are complementary in shape to and in engagement with the recess and the protrusion of the other of the abutments, characterized in that the protrusion and the recess of each of the abutments are juxtaposed to each other in an axial direction of the seal ring, and that a radial gap is defined between one of the protrusions and one of the recesses that are pressed against the side wall of the annular groove near the non-oil pressure side and are complementary in shape to and in engagement with each other, the radial gap and the circumferential gap between the abutments forming a passage through which the oil pressure side communicates with the non-oil pressure side.

Since the protrusion and the recess of each of the abutments are juxtaposed to each other in an axial direction of the seal ring, and a radial gap is defined between one of the protrusions and one of the recesses that are pressed against the side wall of the annular groove near the non-oil pressure side and are complementary in shape to and in engagement with each other, with the radial gap and the circumferential gap between the abutments forming a passage through which the oil pressure side communicates with the non-oil pressure side, the abutments are not complicated in shape, and simply by defining a radial gap between the protrusion and the recess that are complementary in shape to and in engagement with each other, foreign matter contained in oil in the oil pressure side can be smoothly discharged into an annular gap on the non-oil pressure side.

Preferably, the radial gap is not more than 30% of the radial thickness of the protrusion pressed against the side wall of the annular groove near the non-oil pressure side. If the radial gap is more than 30% of the above protrusion, the protrusion tends to be so thin that it may be deformed or broken when the seal ring is mounted.

The circumferential gap has an opening defined between the radially inner surface of the housing and a radially outer edge of the annular groove of the shaft member and communicating with the non-oil pressure side of the annular gap. Preferably, this opening has an area larger than a circumferential sectional area of the radial gap so that foreign matter contained in oil in the oil pressure side can be smoothly discharged into the annular gap in the non-oil pressure side without getting clogged in the in the radial gap.

This seal ring is preferably made of a composition of polyetheretherketone resin. Polyetheretherketone resin (PEEK) has excellent wear resistance and oil resistance and can prolong the life of the seal ring. PEEK may contain various fillers such as carbon fibers.

Since the protrusion and the recess of each of the abutments are juxtaposed to each other in an axial direction of the seal ring, and a radial gap is defined between one of the protrusions and one of the recesses that are pressed against the side wall of the annular groove near the non-oil pressure side and are complementary in shape to and in engagement with each other, with the radial gap and the circumferential gap between the abutments forming a passage through which the oil pressure side communicates with the non-oil pressure side, the abutments are not complicated in shape, and simply by defining a radial gap between the protrusion and the recess that are complementary in shape to and in engagement with each other, foreign matter contained in oil in the oil pressure side can be smoothly discharged into an annular gap on the non-oil pressure side.

The circumferential gap has an opening defined between the radially inner surface of the housing and a radially outer edge of the annular groove and communicating with the non-oil pressure side of the annular gap. Preferably, this opening has an area larger than a circumferential sectional area of the radial gap so that foreign matter contained in oil in the oil pressure side can be smoothly discharged into the annular gap in the non-oil pressure side without getting clogged in the radial gap.

BRIEF DESCRIPTION OF THE DRAWINGS

FIG. 2b is an exploded perspective view of FIG. 2a.

FIG. 3c is a sectional view taken along line IIIc-IIIc of FIG. 3a.

DETAILED DESCRIPTION OF THE INVENTION

Figure 1:
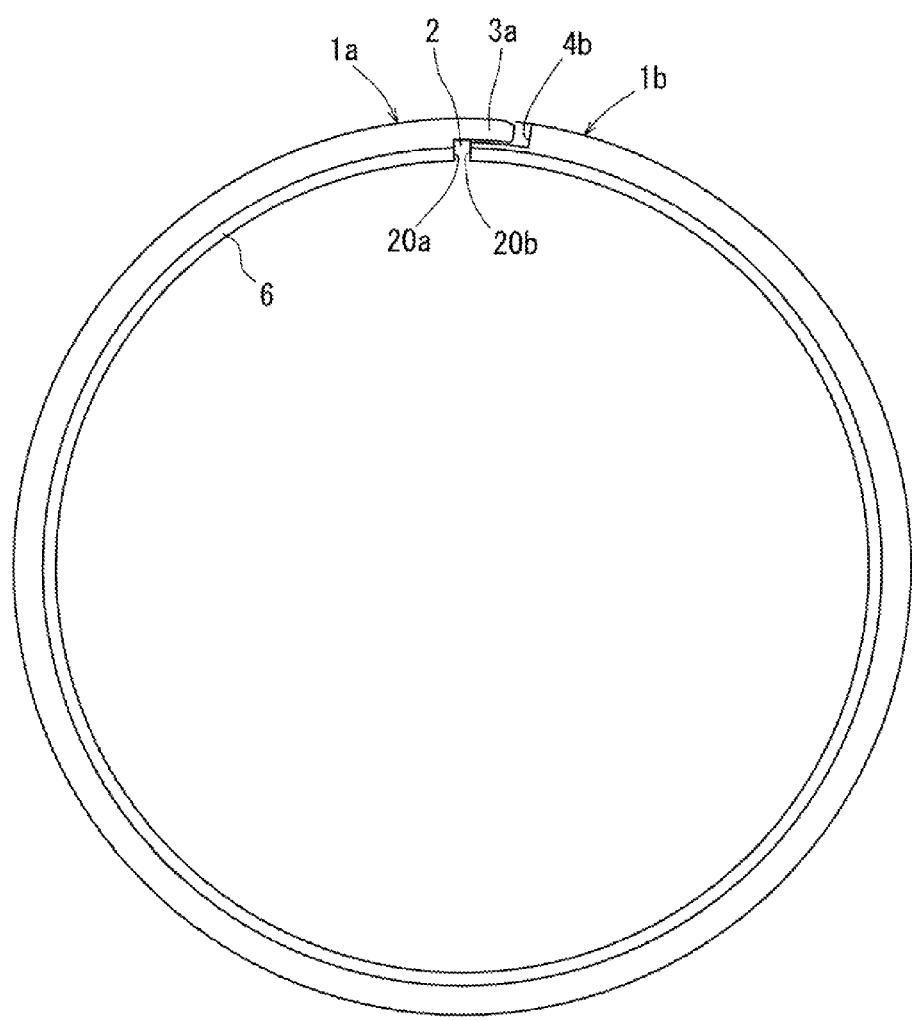
FIG. 1 is a front view of a seal ring embodying the present invention.

Now referring to the drawings, the embodiment of the present invention is described. The seal ring of this embodiment is used in a hydraulic unit of an automatic transmission of a motor vehicle. As shown in FIG. 1, the seal ring is cut apart at one circumferential portion to define circumferentially opposed abutments 1a and 1b. Between end surfaces 20a, 20b, respectively, of the abutments 1a and 1b, a circumferential gap 2 is defined which allows for thermal expansion of the seal ring. The seal ring is formed by injection molding a resin material comprising PEEK and carbon fiber.

Figure 2A:
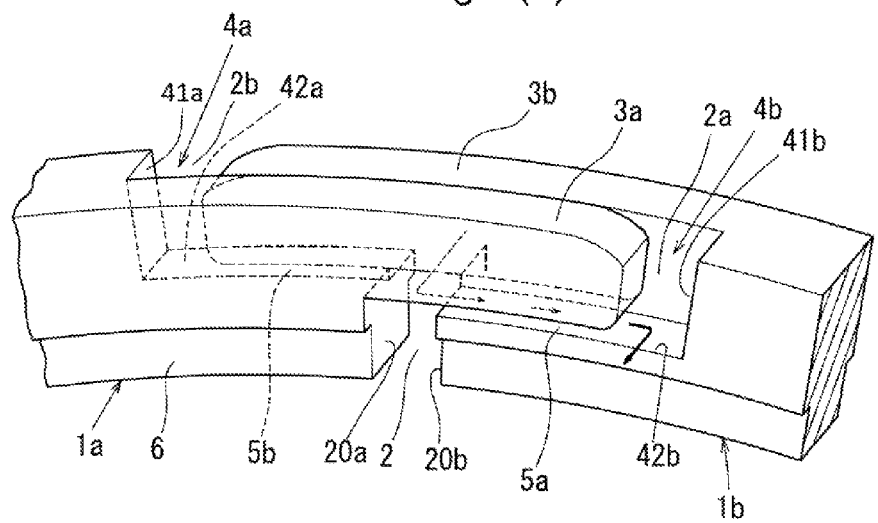
FIG. 2a is an enlarged perspective view of a portion of FIG. 1.
Figure 2B:
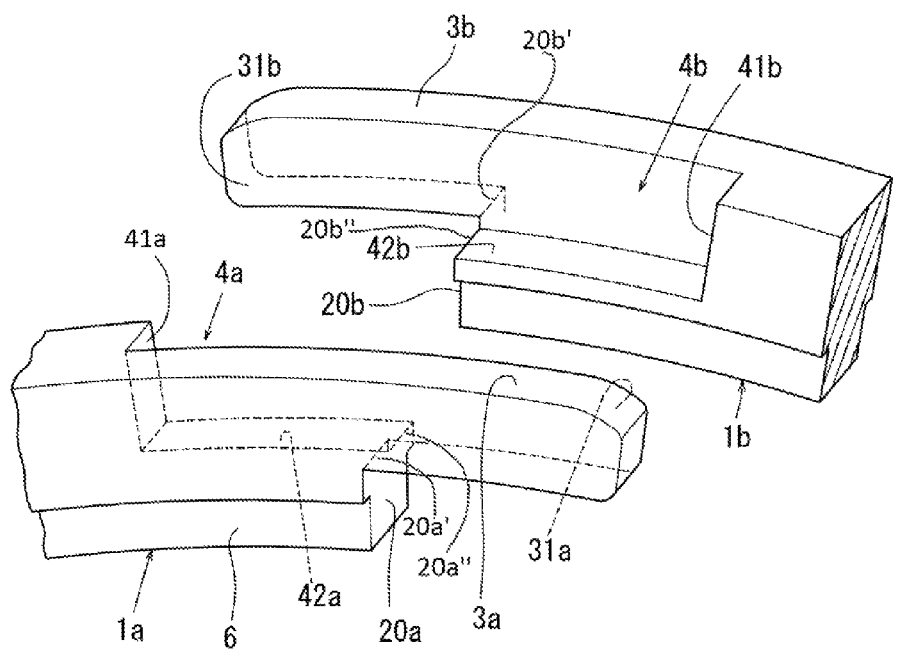

As shown in FIGS. 2(a) and 2(b), the abutment 1a comprises a protrusion 3a and a recess 4a, while the abutment 1b comprises a protrusion 3b and a recess 4b. The protrusions 3a and 3b, as well as the recesses 4a and 4b, are juxtaposed to each other in the axial direction of the seal ring. Also, the protrusion 3a and the recess 4a of the abutment 1a are complementary in shape to and in engagement with the recess 4b and the protrusion 3b of the abutment 1b, respectively. Between the protrusion 3a and the recess 4b and between the protrusion 3b and the recess 4a, radial gaps 5a and 5b are defined, respectively. The recesses 4a and 4b respectively have circumferentially facing surfaces 41a and 41b and radially outwardly facing surfaces 42a and 42b. The radial gaps 5a and 5b are both not more than 30% of the thickness of the protrusions 3a and 3b. Circumferential gaps 2a and 2b are defined between the protrusion 3a and the recess 4b and between the protrusion 3b and the recess 4a, respectively. The inner side surfaces (i.e., first and second axially facing surfaces 31a and 31b, respectively) of the protrusions 3a and 3b are in close (surface) contact with each other. As shown in FIGS. 2(a) and 2(b), the end surfaces 20a, 20b of the abutments 1a, 1b each have a radially outer stepped edge including a radially outer edge portion 20a', 20b', and a radially inner edge portion 20a'', 20b''.

Figure 3A:
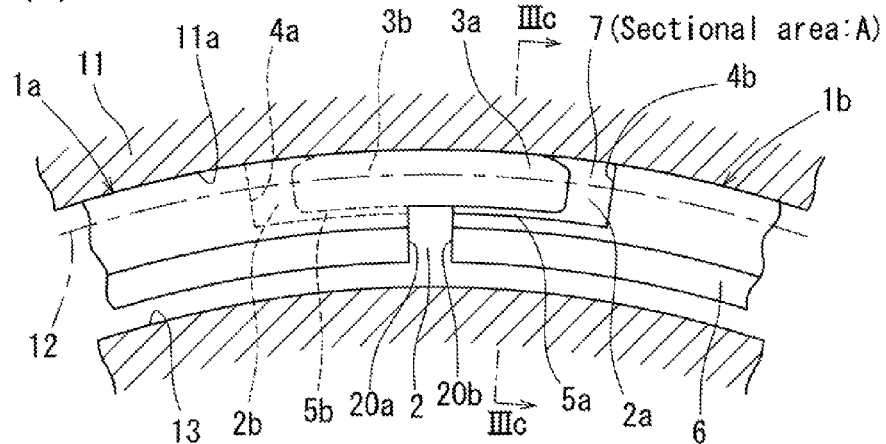
FIG. 3a is a partial enlarged front view of the seal ring, as mounted in an annular groove of a shaft member.
Figure 3B:
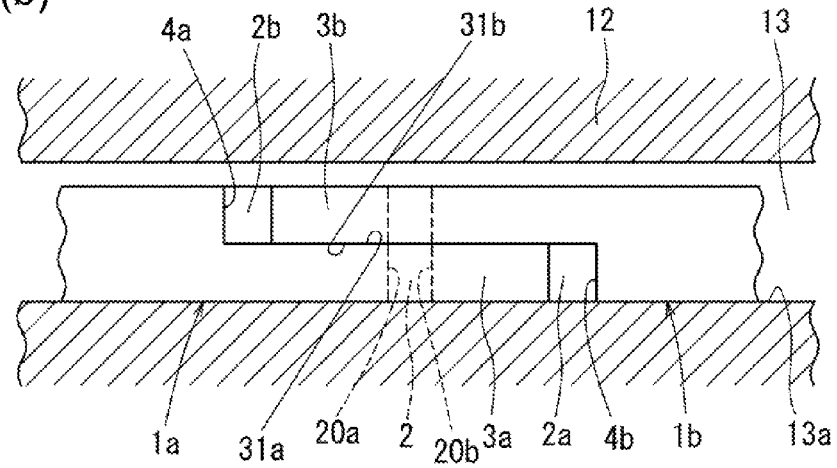
FIG. 3b is a side view thereof as viewed from the radially outer side.
Figure 3C:
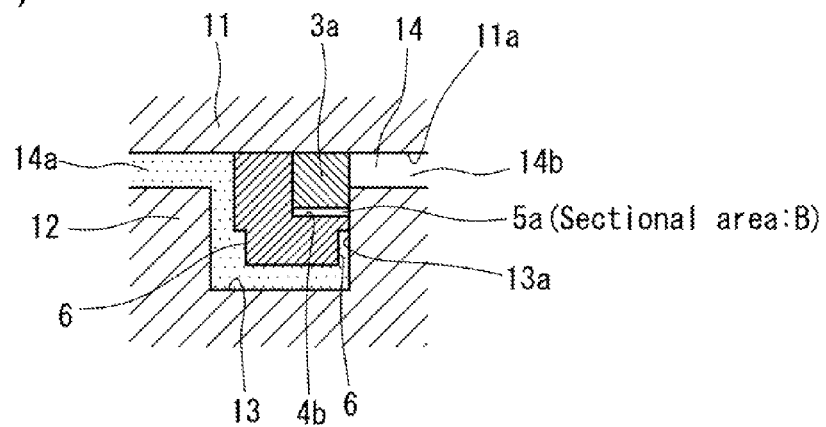

As shown in FIGS. 3(a), 3(b) and 3(c), the seal ring is fitted in an annular groove 13 formed in the radially outer surface of a shaft member 12 rotatably mounted in a housing 11 of a hydraulic unit. The seal ring has its radially outer surface pressed against the radially inner surface 11a of the housing 11 and one side surface thereof pressed against one side wall 13a of the annular groove 13, thereby partitioning the an annular gap 14 between the housing 11 and the shaft member 12 into an oil pressure side 14a remote from the side wall 13a and a non-oil pressure side 14b near the side wall 13a. The above one side surface of the seal ring is formed with a shoulder 6 at its radially inner portion to reduce the contact area between this side surface and the side wall 13a, thereby reducing the sliding resistance between the side wall 13a and the seal ring. As illustrated in FIGS. 2(a), 3(b) and 3(c), the first and second axially facing surfaces 31a, 31b of the protrusions 3a, 3b, respectively, are in surface contact with each other so that no axial gap is disposed axially between the protrusions 3a, 3b.

The protrusion 3a of the abutment 1a and the portion of the abutment 1b defining the recess 4b are pressed against the side wall 13a of the annular groove 13 which is near the non-oil pressure side 14b. The circumferential gap between the protrusion 3a and the recess 4b communicates with the non-oil pressure side 14b of the annular gap 14 through an opening 7 defined between the radially inner surface 11a of the housing 11 and the radially outer edge of the annular groove 13. Thus, the non-oil pressure side 14b of the annular gap 14 communicates with the oil pressure side 14a of the annular gap 14 through the opening 7, the circumferential and radial gaps 2a and 5a between the protrusion 3a and the recess 4b, and the circumferential gap 2 between the abutments 1a and 1b. Thus, as shown by arrows in FIG. 2(a), oil in the oil pressure side 14a leaks into the non-oil pressure side 14b through these passages.

The area A of the opening 7 shown in FIG. 3(a) is larger than the circumferential sectional area B of the radial gap 5a (see FIG. 3(c)). Thus, any foreign matter contained in oil in the oil-pressure side 14a can be smoothly discharged to non-oil pressure side 14b of the annular gap 14 without getting stuck in the radial gap 5a.

In this embodiment, for symmetry of the seal ring, the second radial gap 5b is formed between the protrusion 3b and the recess 4a, which are provided near the oil pressure side 14a. The passage comprising the opening 7 and the circumferential gap 2 therefore communicates with the oil pressure side 14a through this radial gap 5b and the circumferential gap 2b between the protrusion 3b and the recess 4a, too. But the radial gap 5b between protrusion 3b, which is near the oil pressure side 14a, and the recess 4a may be omitted.

What is claimed is:

1. A seal ring made of a resin and being circumferentially divided at one circumferential portion to define circumferentially opposed first and second abutments (1a, 1b), said first and second abutments having first and second end surfaces (20a, 20b), respectively, circumferentially facing each other with a third circumferential gap (2) defined therebetween, wherein said first abutment (1a) includes a first circumferential protrusion (3a) and a first circumferential recess (4a) that are located radially outwardly of the first end surface (20a) and are juxtaposed to each other in an axial direction of the seal ring, wherein said second abutment (1b) includes a second circumferential protrusion (3a) and a second circumferential recess (4b) that are located radially outwardly of the second end surface (20b) and are juxtaposed to each other in the axial direction of the seal ring, wherein each of said first and second circumferential recesses (4a, 4b) has a radially outwardly facing surface (42a, 42b) and a circumferentially facing surface (41a, 41b), wherein said first end surface (20a) has a first radially outer stepped edge (20a', 20a") comprising a first edge portion (20a') which is a portion of the first circumferential protrusion (3a) and a second edge portion (20a") which is a portion of the radially outwardly facing surface (42a) of the first circumferential recess (4a), the first edge portion (20a') being located radially outward of the second edge portion (20a"), wherein said second end surface (20b) has a second radially outer stepped edge (20b',20b") comprising a third edge portion (20b') which is a portion of the second circumferential protrusion (3b) and a fourth edge portion (20b") which is a portion of the radially outwardly facing surface (42b) of the second circumferential recess (4b), the third edge portion (20b') being located radially outward of the fourth edge portion (20b"), wherein said first and second circumferential protrusion (3a, 3b) have free end portions, respectively, that radially face, are radially spaced apart from, and are kept out of contact with the radially outwardly facing surface (42b, 42a) of the second and first circumferential recesses (4b, 4a), respectively, so as to define a first radial gap (5a) between the free end portion of the first circumferential protrusion (3a) and the radially outwardly facing surface (42b) of the second circumferential recess (4b), a second radial gap (5b) between the free end portion of the second circumferential protrusion (3b) and the radially outwardly facing surface (42a) of the first circumferential recess (4a), a first circumferential gap (2a) between the free end portion of the first circumferential protrusion (3a) and the circumferentially facing surface (42b) of the second circumferential recess (4b), and a second circumferential gap (2b) between the free end portion of the second circumferential protrusion (3b) and the circumferentially facing surface (41a) of the first circumferential recess (4a), wherein the first circumferential gap (2a) is in fluid communication with the third circumferential gap (2) through the first radial gap (5a), and the second circumferential gap (2b) is in fluid communication with the third circumferential gap (2) through the second radial gap (5b), wherein the first and second circumferential protrusions (3a, 3b) have first and second axially facing surfaces (31a, 31b), respectively, that are in surface contact with each other so that no axial gap is disposed anywhere axially between the first and second circumferential protrusions (36a, 3b), wherein the first edge portion (20a') extends across an entire axial dimension of the first circumferential protrusion (3a), and entirety of the first edge portion (20a') is located radially outward of the second edge portion (20a"), wherein the third edge portion (20b') extends across an entire axial dimension of the second circumferential protrusion (3b), and an entirety of the third edge portion (20b') is located radially outward of the fourth edge portion (20b"), wherein said first radial gap is constituted by a first axially uniform radial gap, and wherein said second radial gap is constituted by a second axially uniform radial gap.

2. The seal ring of claim 1, wherein each of said first and second radial gaps is not more than 30% of a radial thickness of the first and second circumferential protrusions.

3. The seal ring of claim 1, wherein each of said first and second circumferential gaps has an opening having an area larger than a circumferential sectional area of said first and second radial gaps.

4. The seal ring claim 1, wherein the resin is constituted by a composition of polyetheretherketone resin.

5. The seal ring of claim 2, wherein each of said first and second circumferential gaps has an opening having an area larger than a circumferential sectional area of said first and second radial gaps.

6. The seal ring of claim 2, wherein the resin is constituted by a composition of polyetheretherketone resin.

7. The seal ring of claim 3, wherein the resin is constituted by a composition of polyetheretherketone resin.

8. The apparatus of claim 1, wherein
the first and second radially outwardly facing surfaces of the first and second circumferential recesses, respectively, extend parallel to a radially outer surface of said seal ring.

9. An apparatus for a hydraulic unit, comprising:
a housing;
a shaft member rotatably mounted in said housing, said shaft member having an annular groove formed in a radially outer surface thereof; and
the seal ring according to claim 1, said seal ring being fit in said annular groove of said shaft member.

10. The apparatus of claim 9, wherein
said housing has a radially inner surface; and
a radially outer surface of said seal ring presses against said radially inner surface of said housing.

11. The apparatus of claim 10, wherein
an axial side surface of said seal ring presses against a side wall of said annular groove.

* * * * *